United States Patent [19]
Liou

[11] Patent Number: 6,027,186
[45] Date of Patent: Feb. 22, 2000

[54] COMPACT DISK STORAGE ASSEMBLY

[76] Inventor: Wen-Hwan Liou, No. 2, Jen Shan Lane, Chang Sha Tsun, Hua Tan Hsiang, Chung Hua Hsien, Taiwan

[21] Appl. No.: 09/245,888

[22] Filed: Feb. 8, 1999

[51] Int. Cl.[7] .................................................. B65D 85/57
[52] U.S. Cl. ...................... 312/9.48; 312/9.58; 312/323; 206/308.1
[58] Field of Search ................................... 312/9.9, 9.47, 312/9.48, 9.58, 9.64, 323; 206/308.1

[56] References Cited

U.S. PATENT DOCUMENTS

| | | | |
|---|---|---|---|
| 4,932,522 | 6/1990 | Milovich | 312/9.48 X |
| 5,097,946 | 3/1992 | Emrich | 312/9.48 X |
| 5,515,979 | 5/1996 | Salvail | 312/9.48 X |
| 5,706,938 | 1/1998 | Niehaus | 206/308.1 |
| 5,730,283 | 3/1998 | Lax | 312/9.48 X |
| 5,833,331 | 11/1998 | Chang | 312/223.2 |
| 5,857,566 | 1/1999 | Fu | 312/9.58 X |
| 5,924,564 | 7/1999 | Lin | 206/308.1 |

*Primary Examiner*—Peter M. Cuomo
*Assistant Examiner*—Hanh V. Tran
*Attorney, Agent, or Firm*—Bacon & Thomas, PLLC

[57] ABSTRACT

An improved compact disk storage assembly that is adapted to serve as a compact disk holder or for installation in a receiving space reserved for a disk drive in a computer mainframe, and that provides enhanced disk storage capacity, including a housing having slide tracks on opposite inner sides thereof, and a plurality of spaced-apart disk storage cases disposed inside the housing and having slide blocks on both sides for engaging the slide tracks. Each disk storage case includes a support rack having retaining grooves at a front end thereof, and a disk receiving plate disposed on the support rack. The disk receiving plate has upper and lower receiving recesses for placement of compact disks. The receiving recess is centrally provided with a retaining flange for positioning a compact disk. The disk receiving plate is provided with projections on both sides thereof. When the disk receiving plate is being pulled out from the support rack, the projections will engage the retaining grooves so that the disk receiving plate will not slip out and can be turned over to facilitate placement or removal of a compact disk on or from the reverse side.

2 Claims, 5 Drawing Sheets

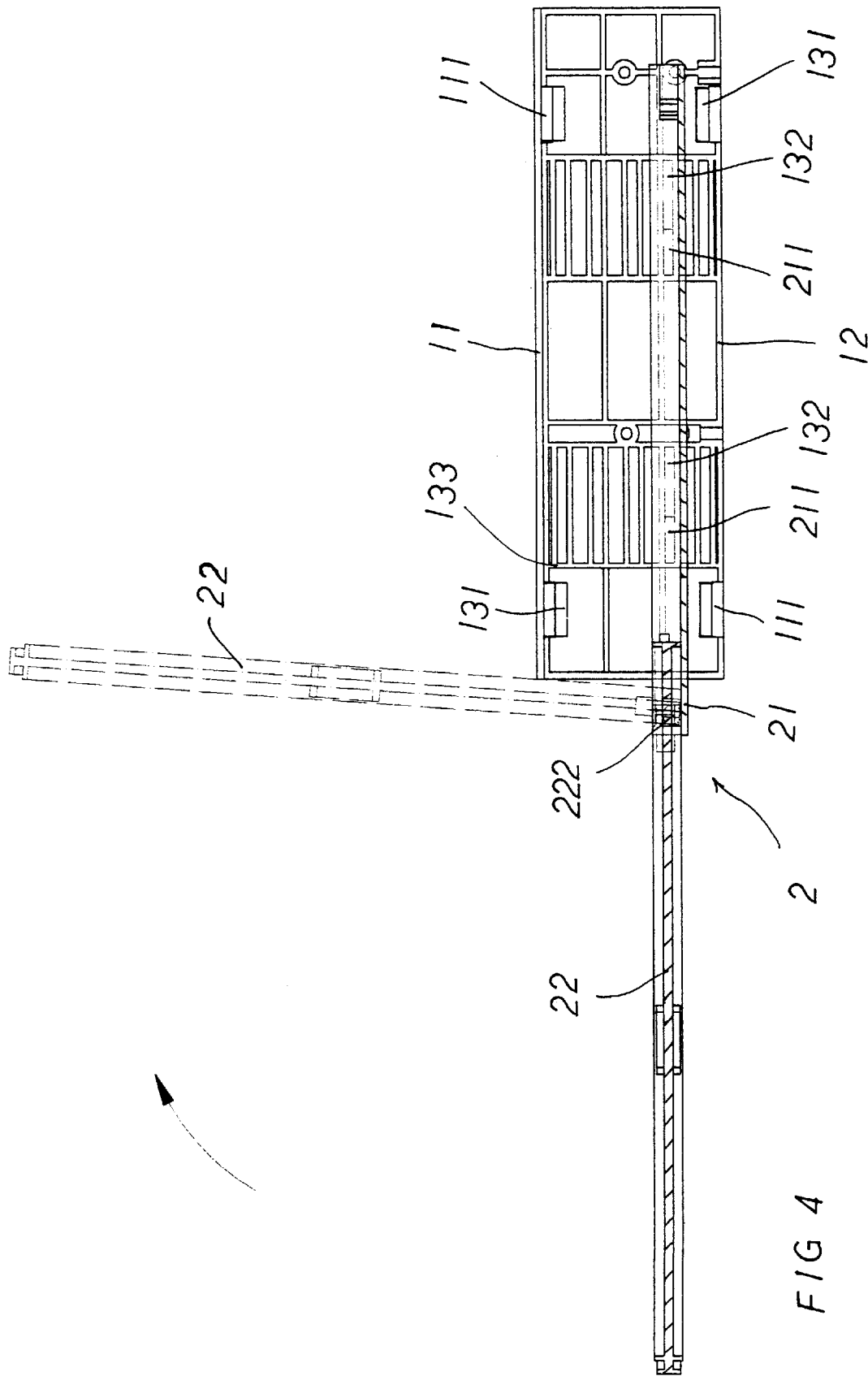

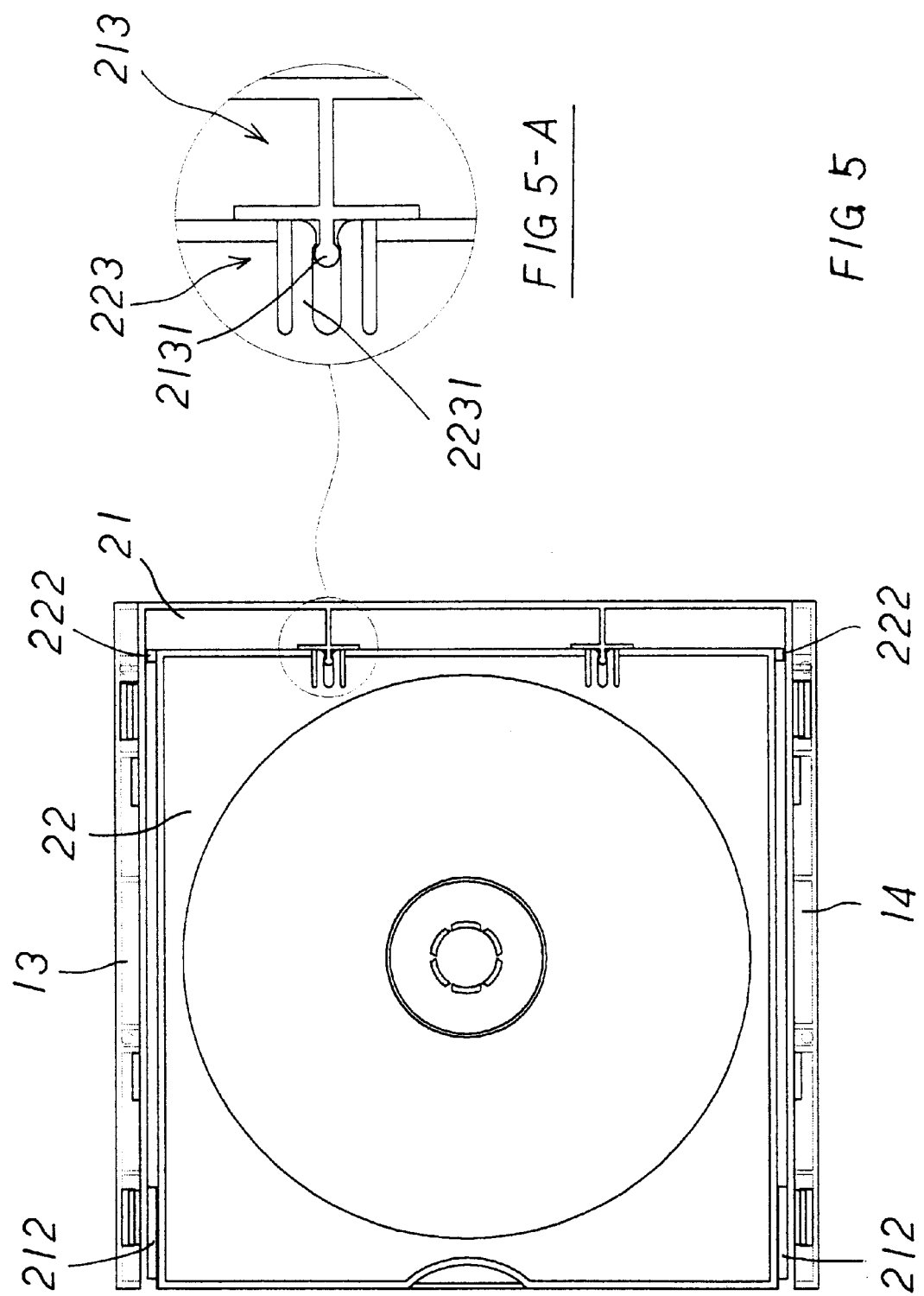

COMPACT DISK STORAGE ASSEMBLY

BACKGROUND OF THE INVENTION

The present invention relates generally to an improved compact disk storage assembly, more particularly to a compact disk storage assembly including a housing and a plurality of disk storage cases, each of which includes a support rack and a disk receiving plate having upper and lower receiving recesses for receiving compact disks, thereby increasing the storage capacity of the assembly.

Application software compact disks are gradually replacing floppy disks. As application software compact disks are not frequently used, it is not desirable to store them alongside with ordinary compact disks. It is preferred to have the application software compact disks stored inside the computer mainframe to save space and allow access thereto.

SUMMARY OF THE INVENTION

A primary object of the present invention is to provide an improved compact disk storage assembly that provides increased disk storage capacity and prevents slippage of compact disks therefrom during placement or removal of the compact disks.

Another object of the present invention is to provide an improved compact disk storage assembly that can be installed directly in a receiving space reserved for a disk drive in a computer mainframe to facilitate access thereto and saves space.

Accordingly, an improved compact disk storage assembly of the present invention includes a housing having slide tracks on opposite inner sides thereof, and a plurality of spaced-apart disk storage cases disposed inside the housing and having slide blocks on both sides for engaging the slide tracks. Each disk storage case includes a support rack having retaining grooves at a front end thereof, and a disk receiving plate disposed on the support rack. The disk receiving plate has upper and lower receiving recesses for placement of compact disks. The receiving recess is centrally provided with a retaining flange for positioning a compact disk. The disk receiving plate is provided with projections on both sides thereof. When the disk receiving plate is being pulled out from the support rack, the projections will engage the retaining grooves so that the disk receiving plate will not slip out and can be turned over to facilitate placement or removal of a compact disk on or from the reverse side.

BRIEF DESCRIPTION OF THE DRAWINGS

The foregoing and other features and advantages of the present invention will be more clearly understood from the following detailed description and the accompanying drawings, in which.

FIG. 1A is a partly enlarged view of a retaining element of the present invention;

FIG. 1B is a partly enlarged view of an engaging element of the present invention;

FIG. 4 is a schematic view of the present invention in which a disk receiving plate is pulled outwardly;

FIG. 5 is a plan top view of the present invention; and

FIG. 5A is a partly enlarged view illustrating engagement of a support rack and the disk receiving plate of the present invention.

DETAILED DESCRIPTION OF THE PREFERRED EMBODIMENT

Figure 1:
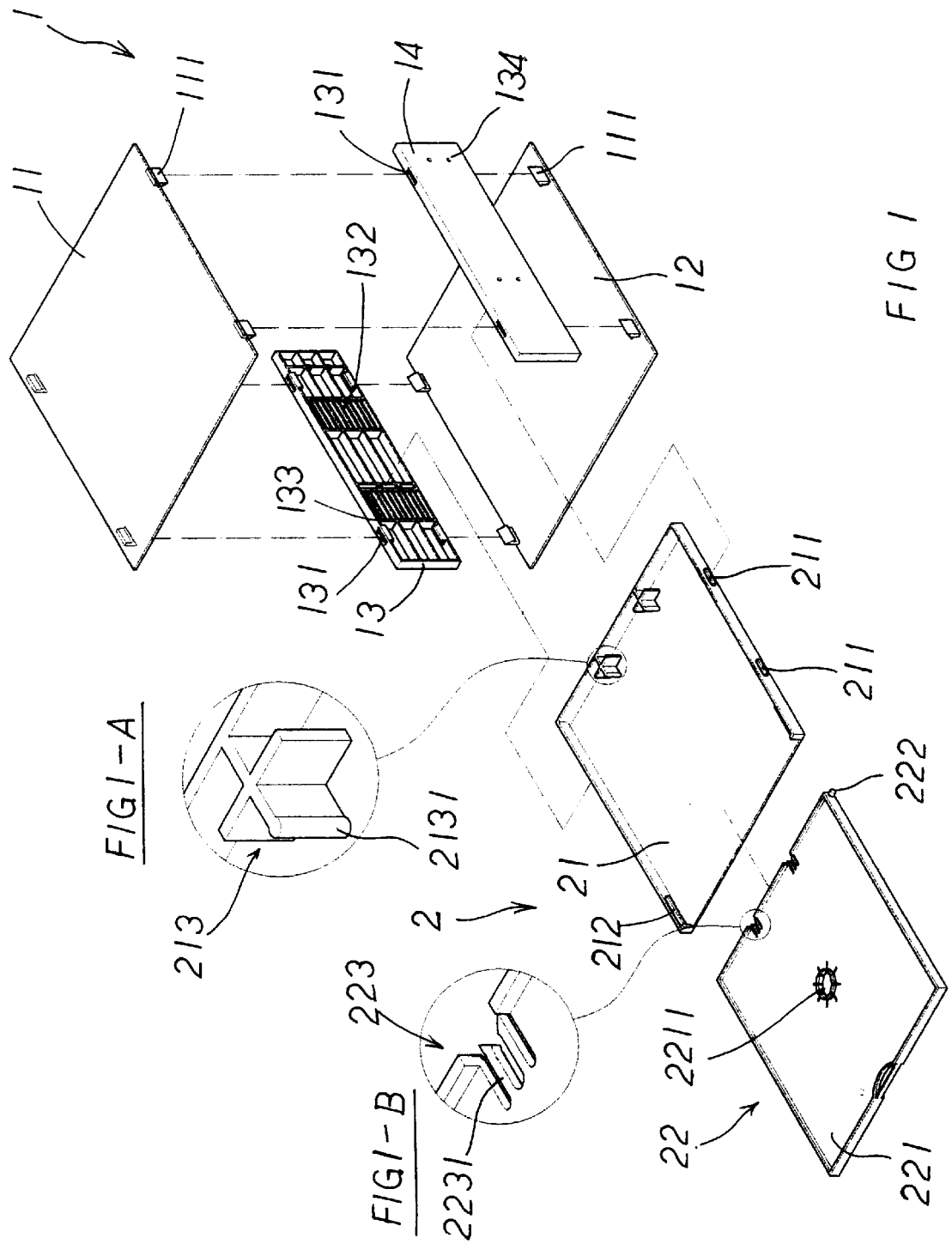
FIG. 1 is an exploded perspective view of the present invention.
Figure 2:
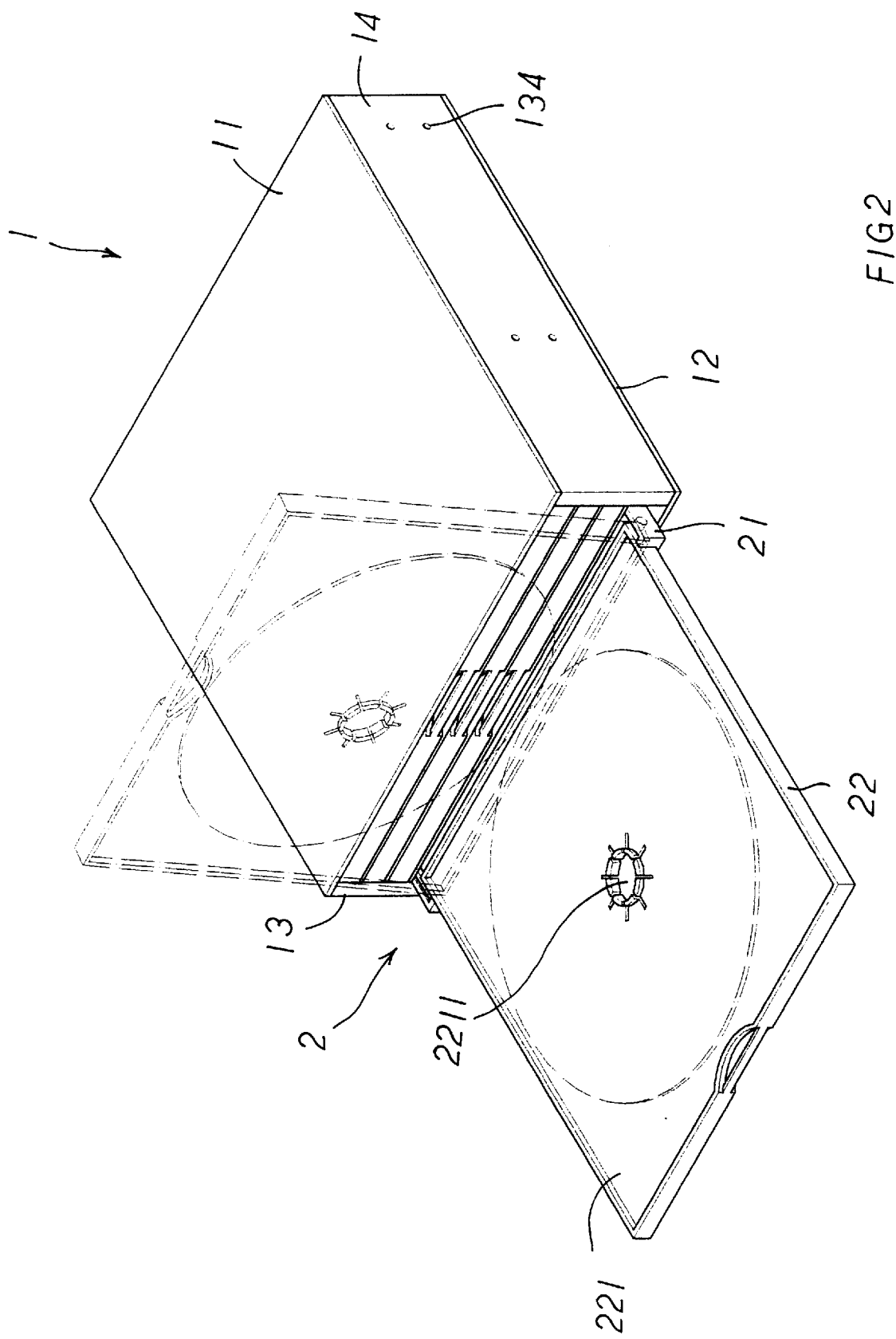
FIG. 2 is an assembled perspective view of the present invention in use.

With reference to FIGS. 1, 2 and 5, a preferred embodiment of an improved compact disk storage assembly according to the present invention comprises a housing 1, and a plurality of disk storage cases 2 stacked inside the housing 1.

The housing 1 includes an upper cover 11, a base 12, and left and right side plates 13, 14 locked to the housing 1 by passing bolts through securing holes 134 of the side plates. A lower side of the upper cover 11 and an upper side of the base 12 are both provided with retaining hooks 111 at four corners thereof at suitable positions. Upper and lower end faces of the left and right side plates 13, 14 are provided with hook engaging holes 131 to match the retaining hooks 111 on the upper cover 11 and the base 12. Inner sides of the left and right side plates 13, 14 are respectively provided with a plurality of slide tracks 132 that are of equal length and that are spaced apart from each other in a parallel relationship. A stop 133 is provided at a front end of each slide track 132.

Each storage case 2 includes a support rack 21 and a disk receiving plate 22 disposed on the support rack 21. The support rack 21 has two lateral side walls and a rear wall. Each lateral side wall is provided with two slide blocks 211 near front and rear ends on the outer side thereof, that are adapted to displace slidably along the slide tracks 132 on the inner sides of the corresponding one of the left and right side plates 13, 14. A retaining groove 212 of a suitable length is provided at the front end of the lateral side wall of the support rack 21 on the inner side thereof. Two spaced-apart retaining elements 213 are provided on the rear wall thereof. Each retaining element 213 has a positioning protrudent rib 2131 at a front end thereof.

The disk receiving plate 22 has upper and lower sides forming a receiving recess 221 adapted to receive a disk. The receiving recess 221 is centrally provided with a retaining flange 2211 for retaining and positioning the disk. A projection 222 is provided on either side of the receiving plate 22 near its rear end to engage the corresponding retaining groove 212 of the support rack 21. Two spaced-apart engaging elements 223 are provided at a rear end of the disk receiving plate 22 to correspond to the retaining elements 213 of the support rack 21. Each engaging element 223 is provided with an elastic fastener 2231 to correspond to the positioning protrudent rib 2131 of the retaining element 213 such that the positioning protrudent rib 2131 may be inserted into the elastic fastener 2231 and be positioned therein or disengaged therefrom, as shown in FIGS. 1A, 1B, and 5A.

In assembly, the retaining hooks 111 at the four corners of the base 12 are respectively inserted into the hook engaging holes 131 on the lower end faces of the left and right side plates 13, 14 to assemble the base 12 and the left and right side plates 13, 14 as a whole. Then, the receiving plate 22 is placed on the support rack 21 to form the above-mentioned disk storage case 2. The left and right side plates 13, 14 are spread outwardly and the plurality of disk storage cases 2 are stacked inside the housing 1 in turn such that the slide blocks 211 of each disk storage case 2 engage the slide tracks 132 on the inner sides of the left and right side plates 13, 14 when the latter are brought back inwardly. The retaining hooks 111 at the four corners of the upper cover 11 are then inserted into the hook engaging holes 131 at the upper end faces of the left and right side plates 13, 14 to accomplish assembly of the disk storage assembly according to the present invention.

Figure 3:
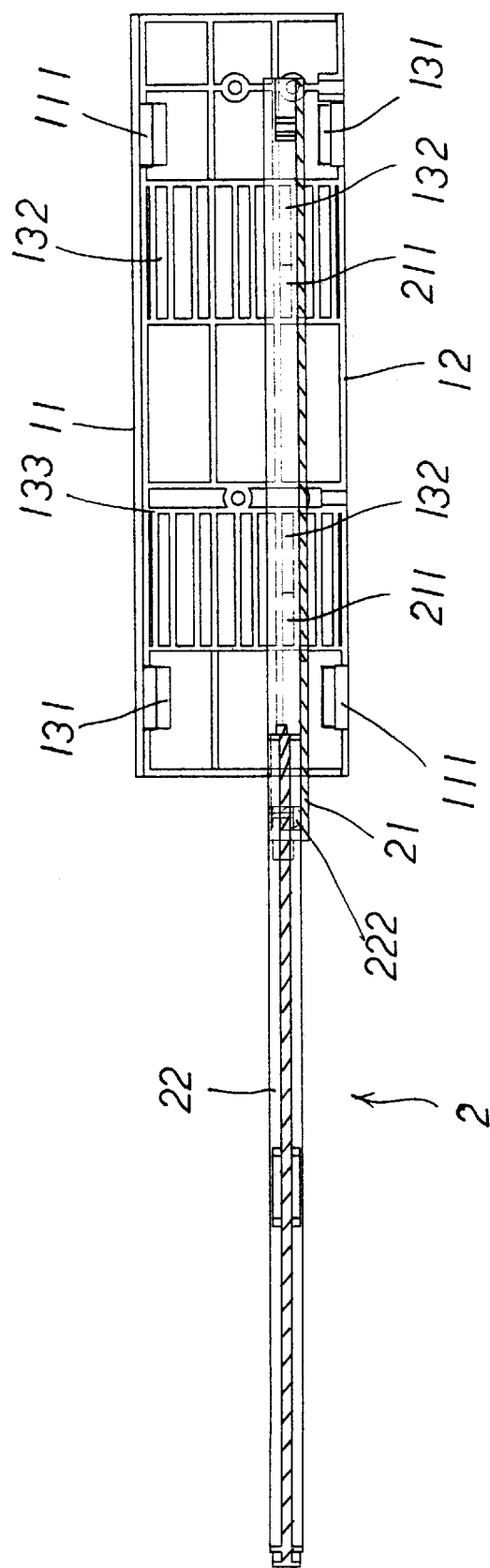
FIG. 3 is a plan side view of the present invention.

Referring to FIG. 3, since the disk storage cases 2 are confined within the housing 1, possible slippage thereof is prevented. Furthermore, due to the provision of the slide tracks 132 on the inner sides of the left and right side plates 13, 14 of the housing 1, the support rack 21 can displace slidably forwardly and rearwardly. When the support rack 21 is being pulled out, its forward displacement is checked by the stop 133 at the front end of each slide track 132 so that it will not drop out of the housing 1.

Referring to FIG. 4, the retaining grooves 212 at the front end of the support rack 21 have a portion thereof projecting from the front side of the housing 1. When the disk receiving plate 22 is being pulled out, the projections 222 will just be located inside the retaining grooves 212 of the support rack 21 so that the disk receiving plate 22 will not slip out. Furthermore, the projections 222 can serve as pivots whereby the disk receiving plate 22 can be turned over to allow placement of disks on both sides of the disk receiving plate 22 and to facilitate placement and removal of disks, thus increasing the storage capacity of the disk storage assembly.

Although the present invention has been illustrated and described with reference to the preferred embodiment thereof, it should be understood that it is in no way limited to the details of such embodiment but is capable of numerous modifications within the scope of the appended claims.

What is claimed is:

1. An improved compact disk storage assembly, comprising a housing, and a plurality of disk storage cases arranged in a spaced-apart relationship inside said housing, wherein said housing includes an upper cover, a base, and left and right side plates, a lower side of said upper cover and an upper side of said base being both provided with retaining hooks at four corners thereof, upper and lower end faces of said left and right side plates being provided with hook engaging holes for engaging said retaining hooks on said upper cover and said base, inner sides of said left and right side plates being respectively provided with a plurality of slide tracks that are of equal length and that are spaced apart from each other in a parallel relationship, a stop being provided at a front end of each of said slide tracks;

said storage cases each includes a support rack and a disk receiving plate disposed on said support rack, in which said support rack having two lateral side walls and a rear wall, each lateral side wall being provided with slide blocks near front and rear ends on an outer side thereof that are adapted to displace slidably along said slide tracks on the inner sides of said corresponding one of said left and right side plates, retaining grooves being provided at the front ends of said lateral side walls of said support rack on the inner sides thereof; and said disk receiving plate has upper and lower sides forming a receiving recess adapted to receive a disk, said receiving recess being centrally provided with a retaining flange for retaining and positioning the disk, projections being provided on both sides of said receiving plate to engage said retaining grooves of said support rack such that said projections engage said retaining grooves of said support rack when said disk receiving plate is being pulled out so as to permit pulling out of said support rack with said disk receiving plate, whereby each of said disk receiving plates can be pulled out individually along with the corresponding support rack to a certain distance to allow placement or removal of disks, said disk receiving plates being turnable to allow placement of disks on both sides thereof, thereby increasing the storage capacity of said compact disk storage assembly.

2. The improved compact disk storage assembly as claimed in claim 1, wherein said support rack is provided with retaining elements at said rear wall near both ends thereof, said retaining elements each having a positioning protrudent rib at a front end thereof, said disk receiving plate being provided with engaging elements at a rear end thereof to correspond to said retaining elements of said support rack, said engaging element being provided with an elastic fastener for engaging releasably said positioning protrudent rib inserted therein.

* * * * *